Feb. 7, 1950  J. H. CULBERTSON  2,496,519
MULTIJOINTED DEVICE
Filed Jan. 10, 1947  2 Sheets-Sheet 1
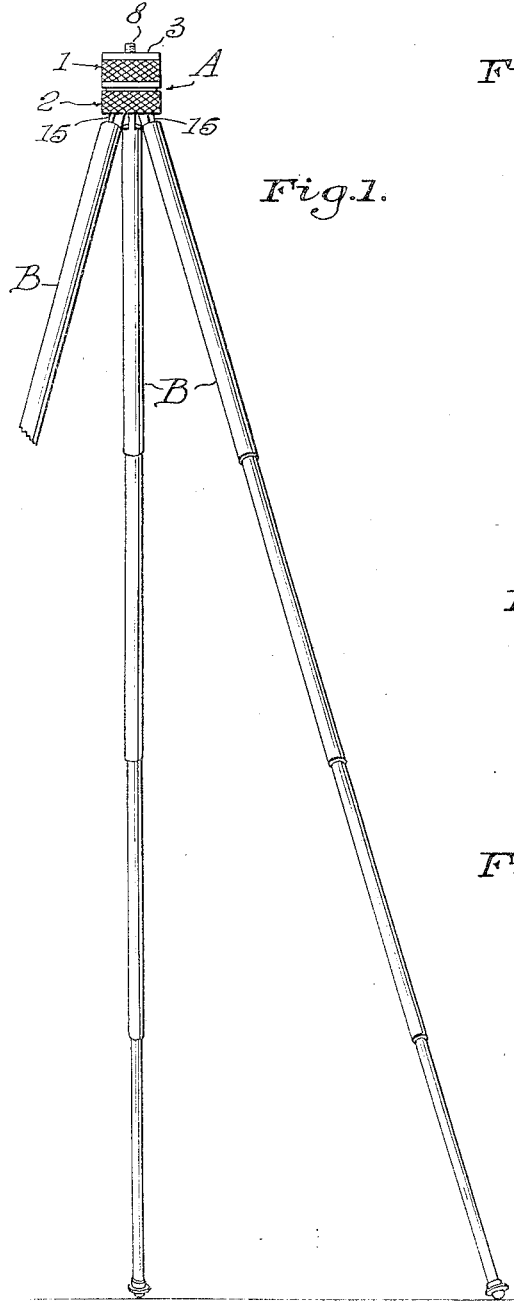
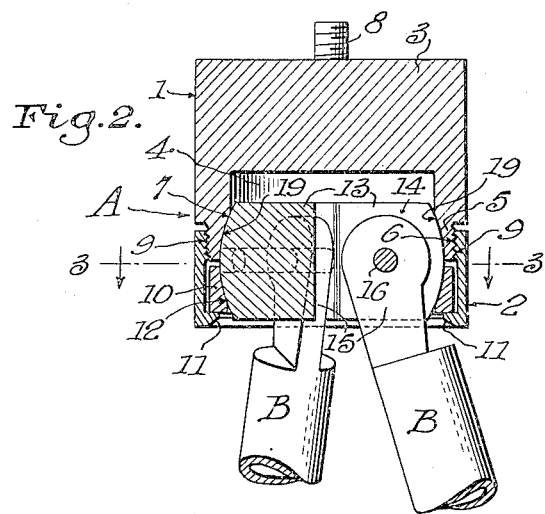
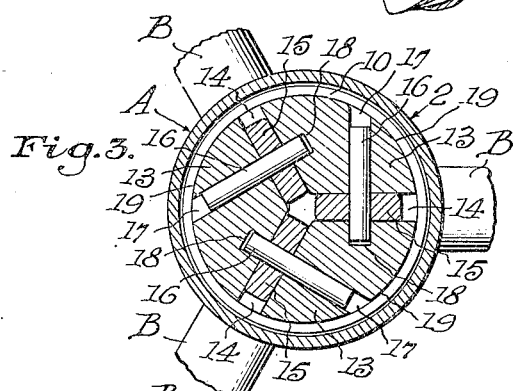
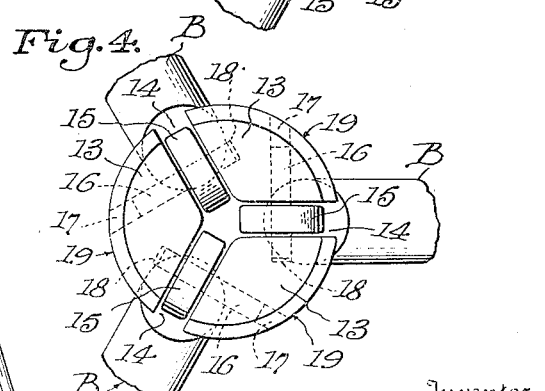
Inventor
John H. Culbertson
By Baldwin & Wight
his Attorneys Feb. 7, 1950 J. H. CULBERTSON 2,496,519
MULTIJOINTED DEVICE Filed Jan. 10, 1947 2 Sheets-Sheet 2

Inventor
John H. Culbertson
By Baldwin & Wight
his Attorneys

Patented Feb. 7, 1950

2,496,519

UNITED STATES PATENT OFFICE 2,496,519

MULTIJOINTED DEVICE

John H. Culbertson, Princeton, N. J.

Application January 10, 1947, Serial No. 721,289

3 Claims. (Cl. 248—188)

This invention relates to multijointed devices, and more particularly to devices including a head or body to which a plurality of arms, legs, or other shank-like members is connected so as to be individually adjustable with respect to the head or body, and to each other.

The invention may be embodied with special utility in tripods such as are used for supporting cameras, surveying instruments, or the like, but is not limited to such uses.

An object of the invention is to provide a device of the class referred to including a head formed in two parts which can be forced together to cause a plurality of blocks mounted within the head to move inwardly to thereby clamp radially extending faces on a plurality of arm ends disposed in radial slots between the blocks.

Another object of the invention is to provide a device of the kind described in which the arms can be locked simultaneously in adjusted position by the single operation of forcing the head parts together.

A further object of the invention is to provide a device of the character stated which is of simple and economical construction, and is efficient and reliable in use. Other objects will become apparent from a reading of the following description, the appended claims, and the accompanying drawing, in which:

Figure 1 is an elevation of a tripod including a multijointed device embodying the invention;

Figure 2 is a vertical section through the multijointed device shown in Figure 1;

Figure 3 is a horizontal section on the line 3—3 of Figure 2;

Figure 4 is a top plan view of the multijointed device with a top head part removed;

Figure 5:
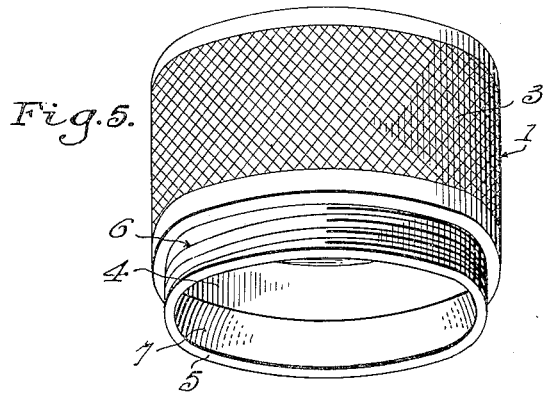
Figure 5 is a perspective view of a top head part.
Figure 6:
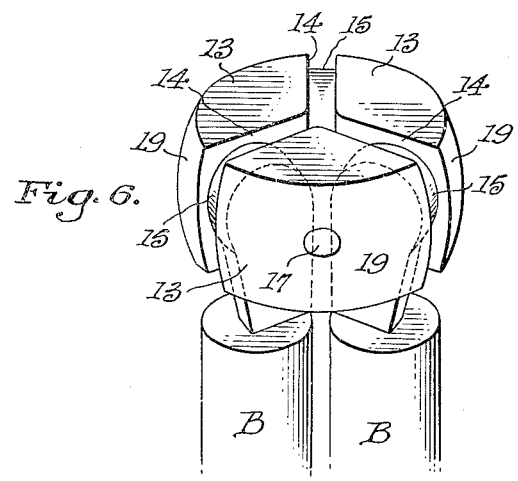
Figure 6 is a perspective view of an assembly of adjustable arms and sector shaped blocks.
Figure 7:
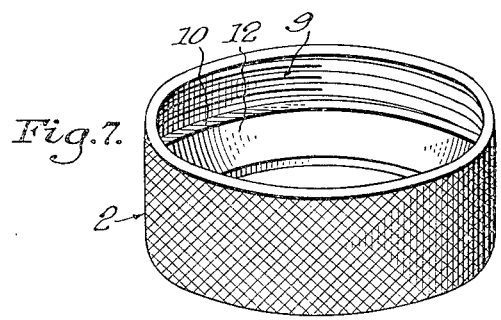
Figure 7 is a perspective view of a bottom head part.

Figure 1 shows a device constructed in accordance with the invention embodied in a tripod of the kind used, for example, for supporting cameras, surveying instruments or the like. The device comprises a head generally designated A and three legs or supporting arms B. The device has particular utility when used in tripod constructions, but it will be apparent that it may be used also in other multijointed constructions in which a plurality of legs, arms, or other shank-like members are connected to a common head portion and are locked in individually adjusted positions.

The head A embodied in the construction shown in Figures 1 to 7, inclusive, is formed in two parts, a top part 1 and a bottom part 2. The head top part 1 is of generally cylindrical form, and includes a body 3 formed with a recess 4, and a lower end flange 5 which is exteriorly threaded at 6. The flange 5 has an inwardly facing clamping surface 7 which is formed as a section of a spherical surface for purposes to be explained later. The head top part 1 may be formed or equipped with any suitable means for mounting a camera, surveying instrument or the like, and in the form shown, the mounting means is constituted by a threaded stud 8.

The head bottom part 2 is formed generally as a ring and is threaded internally as at 9 to enable it to be screwed on the top part 1. The bottom part 2 is provided with an inserted ring part 10 which rests upon a flange 11 formed along the lower edge of the head part 2. If desired, the ring part 10 may be formed integrally with the lower head part 2. In either case, the ring part 10 is formed with a surface 12 complementary to the surface 7 of the top head part 1, the surface 12 also being a section of a spherical surface.

Disposed within the head A are three sector shaped blocks 13 which are separated from each other by substantially radial slots 14. The slots 14 respectively receive flat end portions 15 of the arms B. Pins 16 extend across the slots 14 and through the arm end portions 15 so as to mount the arms B for pivotal adjusting movement. The pins 16 are mounted in openings 17 and 18 in blocks 13 with a slight amount of diametral and axial play so as to enable the blocks 13 to move radially inwardly into clamping engagement with the arm end portions 15.

The peripheral portions 19 of the blocks 13 are formed as sections of a spherical surface complementary to the surfaces 7 and 12 on the head parts 1 and 2. The surface 7 on the head part 1 is disposed above a central plane common to the blocks 13 located as indicated by the section line 3—3 in Figure 2; and the clamping surface 12 on the lower head part 2 is located below this plane. Consequently, when the head parts 1 and 2 are turned relatively to each other, the screw threads 6 and 9 will force the head parts together, causing the clamping surfaces 7 and 12 to press radially inwardly on the sector surfaces 19, thereby forcing the sectors 13 inwardly, and causing their slot-defining radial surfaces to clamp the arm end portions 15 in adjusted positions. Thus, by merely performing the single operation of turning one of the head parts relatively to the other, all three of the arms B may be locked simultaneously in individually adjusted positions. By unscrewing one head part very slightly, the clamping pressures are released, permitting the arms B to be adjusted easily, after which they again may be locked in place by merely turning one of the head parts relatively to the other.

In the modification shown in Figures 8 to 10, the general organization of the parts is similar to that described with reference to Figures 1–7, but in the modified construction there are no separate pins for mounting the arms pivotally in the sector blocks. Instead, the end portions 15' of the legs B' and the radial faces of the blocks 13' are co-relatively shaped to interfit with each other and to thus provide a self-contained pivotal connection. More specifically considered, the sector blocks 13' are formed with recesses 20 of truncated conical shape, and the opposite faces of the arm end portions 15' are formed with protuberances 21 of complementary truncated conical shape. The protuberances 21 fit with the recesses 20 so as to hold the arms B' against separation from the sector block assembly, while permitting pivotal adjusting movement of the arms when the head parts are not screwed tight. The arms B' may be locked in adjusted position in the same manner as described with reference to Figures 1–7, that is, by screwing the top and bottom head parts together.

Figure 8:
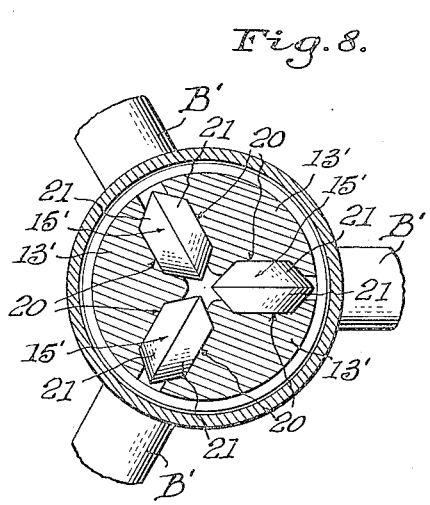
Figure 8 is a horizontal section similar to Figure 3 but showing a modified construction.
Figures 9, 10:
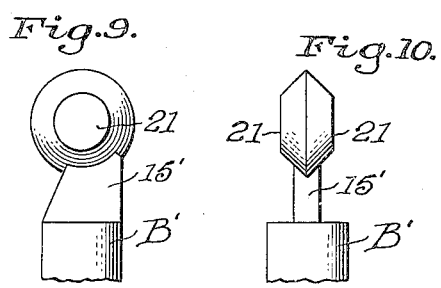
Figure 9 is a fragmentary elevational view of an adjustable arm of the kind embodied in the modification shown in Figure 8.
Figure 10 is an elevation of the arm shown in Figure 9 as viewed at right angles to Figure 9.
Figure 11:
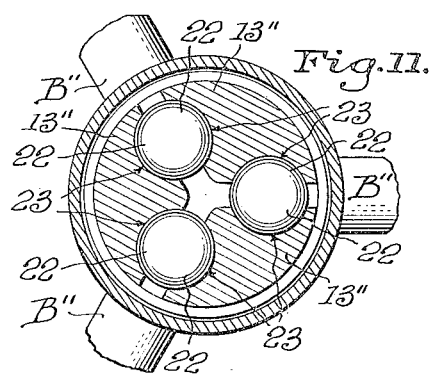
Figure 11 is a top plan view similar to Figure 4 but showing a further modification.
Figure 12:
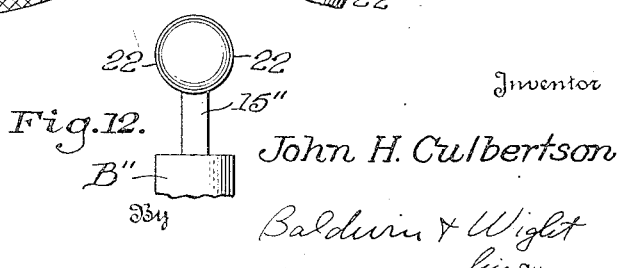
Figure 12 is a fragmentary elevational view of an arm of the form embodied in the construction shown in Figure 11.

In the further modification shown in Figures 11 and 12, the construction is similar to that shown in Figures 8–10 in that no separate pins are provided for mounting the arm ends 15" between the sector blocks 13". In the construction shown in Figures 11 and 12, the arm end portions 15" of the legs B" are formed with spherical ends providing hemispherical protuberances 22 which are received in hemispherical recesses 23 in the sector blocks 13". In this way, the arms B" are mounted pivotally and are held against detachment from the sector block assembly.

The constructions shown embody the invention in practical and preferred forms, but it will be understood that changes may be made without departing from the invention as defined in the claims.

I claim:

1. In a multijointed device, a head comprising two parts having complementary inwardly facing band-like clamping surfaces; a plurality of block members having outwardly facing clamping surfaces complementary to and disposed within the clamping surfaces on said two head parts; generally radial slots between said block members; a plurality of arms having end portions disposed in said slots respectively; bearing means mounting said end portions for relative movement in said slots; and means for forcing said head parts towards each other to press their respective clamping surfaces against the clamping surfaces on said block members and thus force said block members into clamping engagement with said arm end portions.

2. In a multijointed device, a plurality of blocks whose outer surfaces are formed substantially as sections of a spherical surface; generally radial slots between said blocks; a plurality of arms having end portions in said slots respectively; bearing means mounting said end portions for relative movement in said slots; a first head part having an inwardly facing clamping surface complementary to said block outer surfaces and engageable with portions thereof on one side of a central plane common to said blocks; a second head part having an inwardly facing clamping surface complementary to said block outer surfaces and engageable with portions thereof on the opposite side of said plane; and means for forcing said head parts axially together to press their respective clamping surfaces against the respectively engaging outer surface portions of said blocks and thus to force said blocks inwardly and into clamping engagement with said arm end portions.

3. In a multijointed device, a plurality of blocks whose outer surfaces are formed substantially as sections of a spherical surface; generally radial slots between said blocks; opposed recesses in the slot-defining substantially radial faces of said blocks; a plurality of arms having end portions disposed on said slots respectively; protuberances on opposite faces of said end portions complementary to and fitting in pairs of said opposed recesses to mount said arms pivotally in said slots respectively; a first head part having an inwardly facing clamping surface complementary to said block outer surfaces and engageable with portions thereof on one side of a central plane common to said blocks; a second head part having an inwardly facing clamping surface complementary to said block outer surfaces and engageable with portions thereof on the opposite side of said plane; and means for forcing said head parts axially together to press their respective clamping surfaces against the respectively engaging outer surface portions of said blocks and thus to force said blocks inwardly and into clamping engagement with said arm end portions.

JOHN H. CULBERTSON.

REFERENCES CITED

The following references are of record in the file of this patent:

UNITED STATES PATENTS

| Number | Name | Date |
| --- | --- | --- |
| 608,850 | Folmer | Aug. 9, 1898 |
| 686,872 | Whetham | Nov. 19, 1901 |
| 806,522 | Clark | Dec. 5, 1905 |
| 2,229,474 | Redmer | Jan. 21, 1941 |

FOREIGN PATENTS

| Number | Country | Date |
| --- | --- | --- |
| 492,615 | Great Britain | Sept. 23, 1938 |